United States Patent [19]

Granger

[11] 4,146,082

[45] Mar. 27, 1979

[54] VACUUM CHUCKS

[75] Inventor: Stephen L. Granger, Kokomo, Ind.

[73] Assignee: Cabot Corporation, Kokomo, Ind.

[21] Appl. No.: 819,618

[22] Filed: Jul. 27, 1977

[51] Int. Cl.² .................... B22D 27/16; B23B 31/30
[52] U.S. Cl. .................... 164/254; 164/341;
279/1 Q; 279/3; 285/18; 285/236
[58] Field of Search .............. 279/3, 1 Q, 4, 1 B,
279/19.6; 51/235; 269/21; 164/253, 254, 339,
341; 13/16; 285/18, 96, 97, 95, 100, 106, 236

[56] References Cited

U.S. PATENT DOCUMENTS

| 2,226,304 | 12/1940 | Dillon | 279/1 Q X |
|---|---|---|---|
| 2,534,527 | 12/1950 | Myers | 279/4 |
| 2,646,998 | 7/1953 | Scheiwer | 285/106 |
| 2,778,865 | 1/1957 | Kongsgaaden | 279/1 Q X |
| 3,033,594 | 5/1962 | Cushman | 285/106 X |
| 3,872,913 | 3/1975 | Lohikoski | 164/253 X |
| 3,989,260 | 11/1976 | Zonkov et al. | 279/4 |
| 4,007,942 | 2/1977 | Hofliger | 279/3 |

OTHER PUBLICATIONS

IBM Tech. Discl. Bulletin, "Expansion Vacuum Tool", vol. 1, No. 2, Aug. 1958, Pedersen et al.

"Tool Holder Assembly", V. A. Ditson, IBM Tech. Discl. Bulletin, vol. 10, No. 9, Feb. 1968.

Primary Examiner—Richard B. Lazarus
Assistant Examiner—William R. Briggs
Attorney, Agent, or Firm—Jack Schuman; Joseph J. Phillips

[57] ABSTRACT

A casting head and clamp arrangement for vacuum aspiration casting of metal rods in glass tubes is provided having a casting head with a generally vertical vacuum passage, a removable vacuum chuck in the lower end of said vacuum passage adapted to receive and hold the end of a glass tube, said chuck including a pair of spaced annular support discs, spaced elongate members connecting said support discs, sleeve members having an internal diameter larger than a glass tube to be held fixed on each of support disc annulus and projecting beyond said discs between the elongate members, an elastomer tube stretched and fixed at its opposite ends to the sleeve members and having an internal diameter smaller than the diameter of the glass tube to be held and vacuum means acting between said discs to cause the elastomer tube to enlarge in internal diameter under vacuum to permit insertion of the glass tubes to be held and to engage and hold the glass tube ends when the vacuum is released.

10 Claims, 4 Drawing Figures

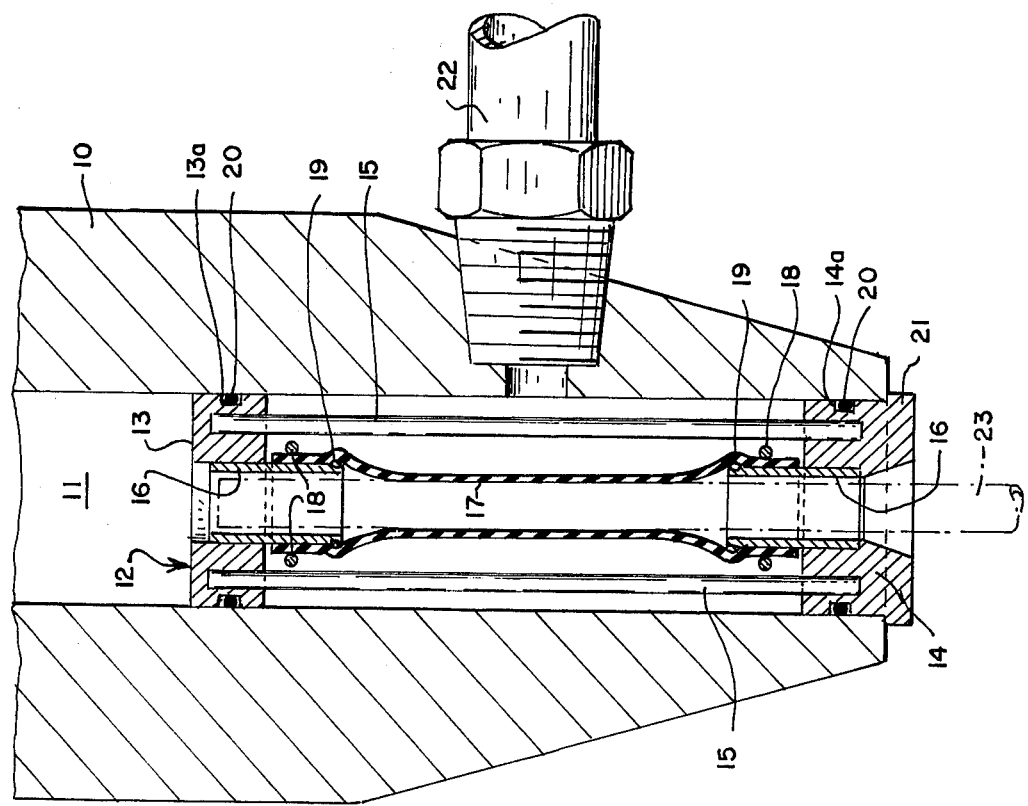

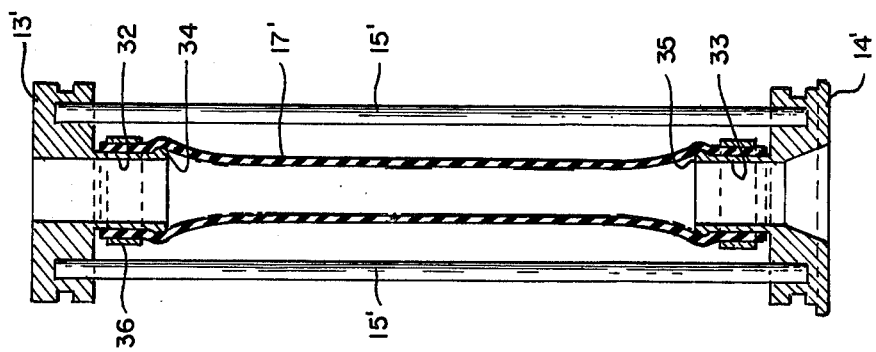
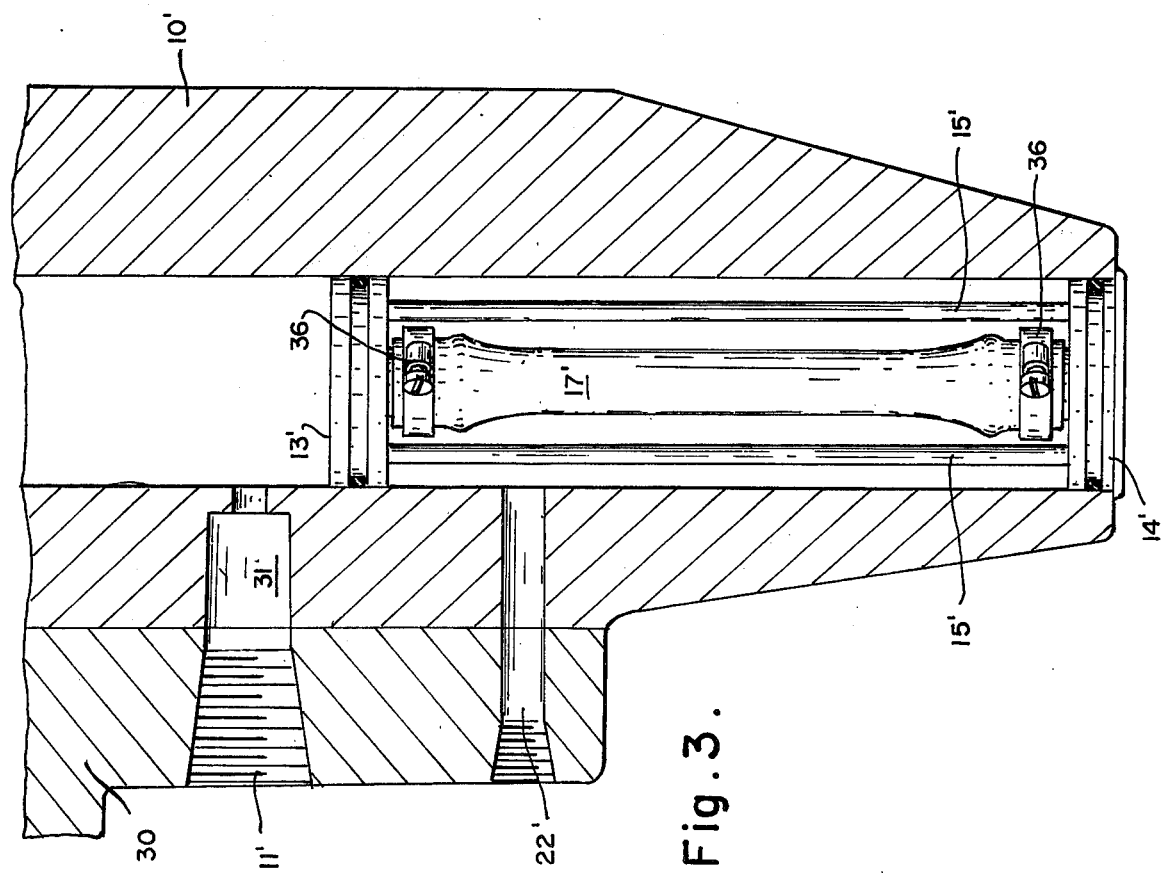

VACUUM CHUCKS

This invention relates to vacuum chucks and particularly to vacuum aspiration casting chucks for aspiration casting of metal welding electrodes and the like.

The practice of aspiration casting of metal welding electrodes by drawing or aspirating molten metal into glass tubes under vacuum is known. There are, however, numerous problems in aspiration casting of such electrodes. One of the major problems lies in the area of chucking or holding one end of the glass tube which is placed under vacuum while the opposite end is inserted in a molten bath of metal and metal is drawn into the glass tube. It is essential that the chucking means act rapidly and positively to engage and release the glass tube end as desired and to hold a vacuum while metal is drawn into the glass tube by aspiration.

I have developed a vacuum chucking means which does act rapidly and positively to engage and release a glass tube end while holding a vacuum during casting. I provide a casting head having a generally vertical vacuum passage and a removable chuck in said vacuum passage, said chuck including a pair of spaced annular support discs, elongate members connecting said support discs, sleeve members having an internal diameter larger than the glass tube to be held fixed in the support disc annulus and projecting out of said discs toward each other, an elastomer tube stretched and fixed at each end to the sleeve members and having an internal diameter smaller than the diameter of the glass tube to be held and vacuum means acting between the support discs to cause the elastomer tube to enlarge in internal diameter to permit insertion of the glass tube ends when vacuum is applied and to engage and hold the glass tube ends when the vacuum is released. Preferably the elastomer tube is a surgical latex rubber tube. The support discs are preferably provided with O-ring seals to seal the chuck in the vacuum passage.

In the foregoing general description of my invention I have set out certain objects, purposes and advantages of my invention. Other objects, purposes and advantages of my invention will be apparent from the following description and the accompanying drawings in which:

FIG. 1 is a fragmentary vertical section through a vacuum aspiration casting head incorporating my invention;

FIG. 2 is a side elevational view of the clamp mechanism of my invention;

FIG. 3 is a fragmentary section through a second embodiment of a vacuum aspiration casting head incorporating a vacuum head according to this invention; and FIG. 4 is a section through the clamp mechanism of FIG. 3.

Referring to the drawings I have illustrated a casting head 10 having an axial passage 11 connected to a vacuum source, not shown, for providing the vacuum for evacuating a glass tube for aspiration casting of metals. A glass tube clamp mechanism 12 is inserted in the lower end of passage 11. The clamp mechanism is made up of an upper support annulus 13 and a lower support annulus 14 connected by elongated rods 15. Each of the support annuli 13 and 14 are provided with a tube sleeve 16 extending out of the annulus toward each other. A surgical latex rubber tube 17 is stretched between the tube sleeves 16 and held by hose clamps 18. Preferably the tube sleeves 16 are provided with holding rings 19. Each of the upper annulus 13 and lower annulus is provided with a groove 13a and 14a carrying an O-ring seal 20. The lower annulus preferably has a radial stop flange 21 abutting the lower end of casting head 10. The portion of the passage 11 between annulus 13 and annulus 14 may be evacuated by vacuum connection 22.

The operation of this clutch mechanism is as follows. Vacuum is applied to connection 22 which causes the tube 17 to expand radially. A glass tube 23 is inserted into the tube 17 and the vacuum in connection 22 is cut off and opened to atmosphere causing the tube 17 to engage glass tube 23. The glass tube 23 end remote from the casting head 10 is inserted in a bath of molten metal and vacuum applied to pasage 11 causing metal to run up tube 23 after which tube 23 is removed from the metal and the metal is cooled.

In FIGS. 3 and 4 I have illustrated an apparatus very similar to that of FIGS. 1 and 2 and like parts will be given the same numeral with a prime suffix. In this embodiment the casting head 10' is a part of a multiple assembly of such heads depending from a carrier 30. The vacuum passage 11' connects to a transverse vacuum passage 31. The upper annulus 13' and the lower annulus 14' are formed with axial extending sleeves 32 and 33 integral therewith, each having a rolled top holding edge 34 and 35. The upper and lower annuli are held together by axial rods 15'. A surgical latex tube 17' is connected to sleeves 32 and 33 by hose clamps 36 of conventional type. The area between annuli 13' and 14' is evacuated through vacuum connection 22' and the clamp is operated precisely as the clamp of FIGS. 1 and 2.

While I have illustrated and described certain preferred practices and embodiments of my invention in the foregoing specification, it will be obvious that this invention may be otherwise embodied within the scope of the following claims.

I claim:

1. A casting head and clamp arrangement for vacuum aspiration casting of metal rods in glass tubes comprising a casting head having a generally vertical vacuum passage, a removable vacuum chuck in the lower end of said vacuum passage adapted to receive and hold the end of a glass tube, said chuck including a pair of spaced annular support discs, spaced elongate members connecting said support discs, sleeve members having an internal diameter larger than a glass tube to be held fixed on each of support disc annulus and projecting beyond said discs between the elongate members, an elastomer tube stretched and fixed at its opposite ends to the sleeve members and having an internal diameter smaller than the diameter of the glass tube to be held and vacuum means communicating with a chamber formed by means between said discs to cause the elastomer tube to enlarge in internal diameter under vacuum to permit insertion of the glass tubes to be held and to engage and hold the glass tube ends when the vacuum is released.

2. A casting head and clamp arrangement as claimed in claim 1 wherein the elastomer tube is of surgical latex rubber.

3. A casting head and clamp arrangement as claimed in claim 1 wherein the elastomer tube is under tension between the two sleeves.

4. A casting head and clamp arrangement as claimed in claim 1 wherein the support discs are provided with circumferential grooves having an O-ring seal engaging the wall of the vertical vacuum passage to seal the area between said discs.

5. A casting head and clamp arrangement as claimed in claim 1 wherein the lowermost disc has stop means abutting the lower end of the casting head to hold the chuck against being drawn into the vacuum passage.

6. A casting head and clamp arrangement as claimed in claim 5 wherein the stop means is a radial flange.

7. A vacuum clutch mechanism for holding the end of a glass tube or the like tubular object comprising a pair of spaced annular support discs, spaced elongated members connecting said discs, sleeve members having an internal diameter larger than a glass tube to be held fixed on each support disc members and projecting beyond said discs between the elongate members, an elastomer tube fixed at its opposite ends to the sleeve members and having an internal diameter smaller than the diameter of the glass tube to be held and vacuum means communicating with a chamber formed by means between said discs to cause the elastomer tube to enlarge in internal diameter under vacuum to permit insertion of the glass tubes to be held and to engage and hold the glass tube ends when the vacuum is released.

8. A vacuum clutch mechanism as claimed in claim 7 wherein the elastomer tube is surgical latex rubber.

9. A vacuum clutch mechanism as claimed in claim 7 wherein the elastomer tube is under tension between the two sleeves.

10. A vacuum clutch mechanism as claimed in claim 7 wherein the sleeve means are integral with the support discs and each sleeve means has a radial holding ring.

* * * * *